US009567731B2

(12) United States Patent
Darukhanavala et al.

(10) Patent No.: US 9,567,731 B2
(45) Date of Patent: Feb. 14, 2017

(54) IMPLEMENT POSITION CALIBRATION USING COMPACTION FACTOR

(71) Applicant: Caterpillar Inc., Peoria, IL (US)

(72) Inventors: Carl P. Darukhanavala, Peoria, IL (US); Troy Kenneth Becicka, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/715,073

(22) Filed: May 18, 2015

(65) Prior Publication Data

US 2016/0340872 A1 Nov. 24, 2016

(51) Int. Cl.
  *E02F 9/26* (2006.01)
  *G07C 5/08* (2006.01)
  *E02F 3/84* (2006.01)
  *G01D 18/00* (2006.01)

(52) U.S. Cl.
  CPC ............... *E02F 9/264* (2013.01); *E02F 3/844* (2013.01); *G01D 18/002* (2013.01); *G07C 5/0841* (2013.01)

(58) Field of Classification Search
  CPC ........ E02F 3/844; E02F 9/264; G01D 18/002; G07C 5/024
  USPC .................................................. 701/33.1, 50
  See application file for complete search history.

(56) References Cited

U.S. PATENT DOCUMENTS

| | | | | |
|---|---|---|---|---|
| 2,649,792 A | * | 8/1953 | Miller | E02F 5/14 37/349 |
| 4,918,608 A | * | 4/1990 | Middleton | E02F 3/847 172/4 |
| 5,025,150 A | * | 6/1991 | Oldham | G01V 5/02 250/253 |
| 5,417,193 A | * | 5/1995 | Fillman | F02D 31/007 123/352 |
| 5,472,056 A | * | 12/1995 | Orbach | A01B 63/1117 172/2 |
| 5,493,494 A | * | 2/1996 | Henderson | E01C 19/004 340/988 |
| 5,880,681 A | * | 3/1999 | Codina | G01D 5/202 324/635 |
| 5,987,371 A | * | 11/1999 | Bailey | E02F 3/842 701/472 |

(Continued)

FOREIGN PATENT DOCUMENTS

EP     2 722 445 A1     4/2014

*Primary Examiner* — Courtney Heinle
*Assistant Examiner* — Angelina Shudy
(74) *Attorney, Agent, or Firm* — Finnegan, Henderson, Farabow, Garrett & Dunner, LLP; L. Glenn Waterfield (57) ABSTRACT

A method, system, and non-transitory computer-readable storage medium for calibrating an implement actuation sensor of a machine are disclosed. The method may include calculating a first elevation value of an implement of the machine. The method may include calculating a second elevation value of a ground-engaging device of the machine. The method may include, in response to determining that the machine is spreading, adjusting the second elevation value based on a compaction factor to determine an adjusted second elevation value. The method may further include determining a first elevation difference value based on a difference between the first elevation value and the adjusted second elevation value. The method may further include calibrating the implement actuation sensor based on the determined difference.

20 Claims, 6 Drawing Sheets

(56) References Cited

U.S. PATENT DOCUMENTS

| | | | | |
|---|---|---|---|---|
| 6,062,317 | A * | 5/2000 | Gharsalli | E02F 3/841 172/2 |
| 6,191,732 | B1 * | 2/2001 | Carlson | E02F 3/842 342/357.3 |
| 6,199,000 | B1 * | 3/2001 | Keller | A01B 79/005 342/357.52 |
| 6,209,232 | B1 * | 4/2001 | Ono | E02F 3/435 37/348 |
| 6,253,160 | B1 * | 6/2001 | Hanseder | E02F 3/435 342/357.27 |
| 6,591,591 | B2 * | 7/2003 | Coers | A01D 41/127 460/6 |
| 6,845,311 | B1 * | 1/2005 | Stratton | E02F 3/847 340/870.16 |
| 6,954,999 | B1 * | 10/2005 | Richardson | E02F 5/02 37/348 |
| 7,714,993 | B2 * | 5/2010 | Cain | E02F 3/437 356/139.04 |
| 7,865,285 | B2 * | 1/2011 | Price | E02F 3/434 172/4.5 |
| 8,145,394 | B2 * | 3/2012 | Chiorean | E02F 3/435 701/33.1 |
| 8,412,418 | B2 | 4/2013 | Kumagai et al. | |
| 8,478,492 | B2 | 7/2013 | Taylor et al. | |
| 8,634,991 | B2 * | 1/2014 | Douglas | E02F 3/847 172/4.5 |
| 8,972,119 | B2 * | 3/2015 | Morin | E02F 3/844 701/50 |
| 9,279,235 | B1 * | 3/2016 | Becicka | E02F 9/2029 |
| 9,328,479 | B1 * | 5/2016 | Rausch | E02F 3/845 |
| 2002/0134559 | A1 * | 9/2002 | Newnam | E02F 3/76 172/817 |
| 2008/0269981 | A1 * | 10/2008 | Pagnotta | E02F 9/2045 701/33.4 |
| 2009/0069988 | A1 * | 3/2009 | Strosser | A01D 41/141 701/50 |
| 2009/0099737 | A1 * | 4/2009 | Wendte | A01B 79/005 701/50 |
| 2009/0187315 | A1 * | 7/2009 | Yegerlehner | A01B 13/08 701/50 |
| 2010/0023228 | A1 | 1/2010 | Montgomery | |
| 2010/0299031 | A1 * | 11/2010 | Zhdanov | E02F 3/845 701/50 |
| 2011/0153168 | A1 * | 6/2011 | Peterson | A01B 79/005 701/50 |
| 2011/0169949 | A1 * | 7/2011 | McCain | G01B 11/022 348/137 |
| 2013/0112124 | A1 * | 5/2013 | Bergen | A01C 5/06 111/151 |
| 2013/0205733 | A1 * | 8/2013 | Peters | A01D 41/127 56/10.1 |
| 2014/0270380 | A1 * | 9/2014 | Morin | E02F 3/847 382/104 |
| 2015/0237790 | A1 * | 8/2015 | Redden | A01B 41/06 701/50 |
| 2015/0240453 | A1 * | 8/2015 | Jaliwala | E02F 9/2041 701/50 |
| 2015/0305239 | A1 * | 10/2015 | Jung | A01D 41/141 701/50 |
| 2015/0354943 | A1 * | 12/2015 | Posselius | A01F 15/08 701/50 |
| 2016/0060845 | A1 * | 3/2016 | Becicka | E02F 9/2029 701/50 |
| 2016/0258129 | A1 * | 9/2016 | Wei | E02F 9/2029 |

* cited by examiner

IMPLEMENT POSITION CALIBRATION USING COMPACTION FACTOR

TECHNICAL FIELD

The present disclosure relates generally to an implement position control system and, more particularly, to an implement position control system having automatic calibration of the implement position sensors using a compaction factor.

BACKGROUND

Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task.

Earthmoving machines such as track type tractors, motor graders, scrapers, and/or backhoe loaders, have an implement such as a dozer blade or bucket, and need continuous adjustment for their operations. For example, the dozer blade or bucket must be adjusted on a worksite in order to alter a geography or terrain of a section of earth. The implement may be controlled by an operator or by a control system to perform work on the worksite such as achieving a final surface contour or a final grade on the worksite. The determination of an absolute 3-D position of the implement cutting edge (e.g., blade cutting edge) is critical for the implement to achieve the desired results.

Conventionally, an implement control system may include a 3-D positioning sensor (e.g. a Global Positioning System (GPS)) attached to the chassis of the machine. In this configuration, actuator position sensors measure displacement of the implement actuators (e.g. hydraulic cylinders) and these sensor outputs are used to calculate the position of the implement cutting edge with respect to the machine chassis (i.e. in a local coordinate frame). Such calculations are, however, highly dependent on precise calibration of the actuator position sensors.

U.S. Pat. No. 6,253,160 to Hanseder ("the '160 patent") discloses an arrangement for calibrating a tool positioning mechanism. The tool positioning mechanism includes a plurality of encoders, which indicate the position of the tool (e.g., a bucket). The encoders are calibrated by mounting a first GPS antenna on the tool and resolving a vector between the first antenna and a second antenna mounted on another portion of the chassis of the machine. Calibration is accomplished by setting the outputs of the encoders to a predetermined value, such as a full-range, which is measured using the vector when the tool is fully extended.

While the '160 patent may provide a useful way to calibrate a tool positioning mechanism, precise calibration may be challenging because the tool positioning mechanism may only work if the machine is placed on a flat surface, which would be difficult if the calibration has to be done in the field.

The implement position control system of the present disclosure is directed toward solving one or more of the problems set forth above and/or other problems of the prior art.

SUMMARY

In one aspect, the present disclosure is directed to a method for calibrating an implement actuation sensor of a machine. The method may include calculating a first elevation value of an implement of the machine. The method may further include calculating a second elevation value of a ground-engaging device of the machine and determining whether a first set of conditions is satisfied. The method may further include, in response to the first set of conditions being satisfied, determining whether the machine is spreading. The method may further include, in response to determining that the machine is spreading, adjusting the second elevation value based on a compaction factor to determine an adjusted second elevation value. The method may further include determining a first elevation difference value based on a difference between the first elevation value and the adjusted second elevation value. The method may further include calibrating the implement actuation sensor based on the determined difference.

In another aspect, the present disclosure is directed to a non-transitory computer-readable storage medium storing instructions that enable a computer to execute a method for calibrating an implement actuation sensor of a machine. The method may include calculating a first elevation value of an implement of the machine. The method may further include calculating a second elevation value of a ground-engaging device of the machine and determining whether a first set of conditions is satisfied. The method may further include, in response to the first set of conditions being satisfied, determining whether the machine is spreading. The method may further include, in response to determining that the machine is spreading, adjusting the second elevation value based on a compaction factor to determine an adjusted second elevation value. The method may further include determining a first elevation difference value based on a difference between the first elevation value and the adjusted second elevation value. The method may further include calibrating the implement actuation sensor based on the determined difference.

In another aspect, the present disclosure is directed an implement position control system in a machine. The system may include an implement actuation sensor associated with an implement of the machine, and a controller in communication with the implement actuation sensor. The controller may be configured to calculate a first elevation value of an implement of the machine. The controller may be configured to calculate a second elevation value of a ground-engaging device of the machine and determine whether a first set of conditions is satisfied. The controller may be configured to determine whether the machine is spreading in response to the first set of conditions being satisfied. The controller may be configured to, in response to determining that the machine is spreading, adjust the second elevation value based on a compaction factor to determine an adjusted second elevation value. The controller may be configured to determine a first elevation difference value based on a difference between the first elevation value and the adjusted second elevation value. The controller may be configured to calibrate the implement actuation sensor based on the determined difference.

DETAILED DESCRIPTION

Figure 1:
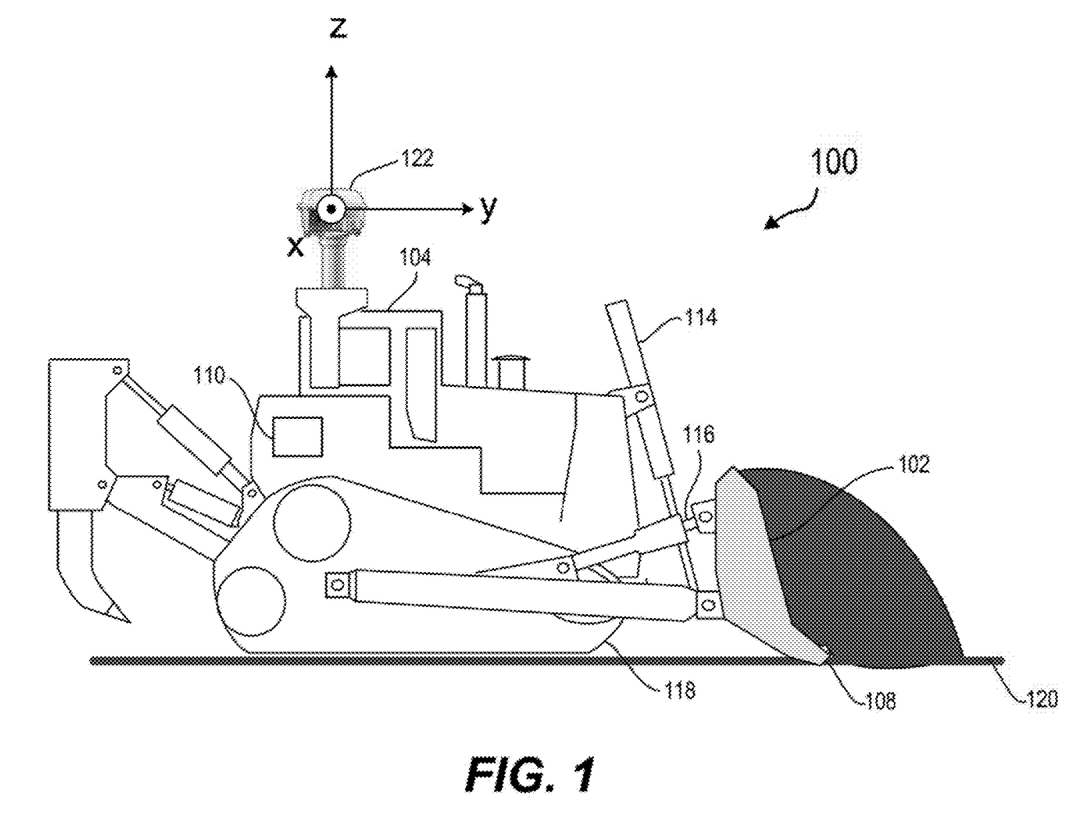
FIG. 1 is a diagrammatic illustration of an exemplary disclosed machine.

FIG. 1 illustrates a pictorial view of an earth-moving machine 100 (also referred to herein as "machine 100") having an earth moving implement 102. The earth-moving implement 102 (also referred to herein as "implement 102"), having a cutting edge 108, may be utilized to move earth or soil on terrain 120. For illustrative purposes, the earth-moving machine 100 is shown as a track-type bulldozer and the earth-moving implement 102 is shown as a bulldozer blade. It will be apparent that exemplary aspects of the present disclosure may be utilized by any machine including other earth-moving machines, such as other track or wheel-type machines.

Machine 100 may include a power source (not shown), an operator's station or cab 104 containing controls necessary to operate machine 100, such as, for example, one or more input devices for propelling the machine 100 or controlling other machine components. The power source may be an engine that provides power to a ground engaging mechanism 118 (e.g., tracks 118) adapted to support, steer, and propel machine 100. The one or more input devices may include one or more joysticks disposed within cab 104 and may be adapted to receive input from an operator indicative of a desired movement of implement 102. Cab 104 may also include a user interface having a display for conveying information to the operator and may include a keyboard, touch screen, or any suitable mechanism for receiving input from the operator to control and/or operate machine 100, implement 102, and/or the other machine components.

Implement 102 may be moveable by one or more hydraulic mechanisms operatively connected to the input device in cab 104. The hydraulic mechanisms may include one or more hydraulic lift actuators 114 and one or more hydraulic tilt actuators 116 for moving implement 102 in various positions, such as, for example, lifting implement 102 up or lowering implement 102 down, tilting implement 102 left or right, or pitching implement 102 forward or backward. In the illustrated embodiment, machine 100 may include one hydraulic lift actuator 114 and one hydraulic tilt actuator 116 on each side of implement 102.

Machine 100 may further include a frame or rigid body disposed between implement 102 and tracks 118. A position determining system 122 adapted to receive and process position data or signals may be mounted to the rigid body of machine 100. In the exemplary embodiments described herein, the position determining device 122 may be a global position satellite (GPS) system receiver. Accordingly, at many places in this disclosure, the position determining device 122 is also referred to as GPS 122. The GPS receiver, as is well known in the art, receives signals from a plurality of satellites and responsively determines a position of the receiver in a coordinate system relative to the worksite, that is, in a site coordinate system. The site coordinate system may be a Cartesian system having an x-coordinate, a y-coordinate, and a z-coordinate. In alternative embodiments, position determining system 122 may include other types of positioning systems without departing from the scope of this disclosure, such as, for example, laser referencing systems.

Figure 2:
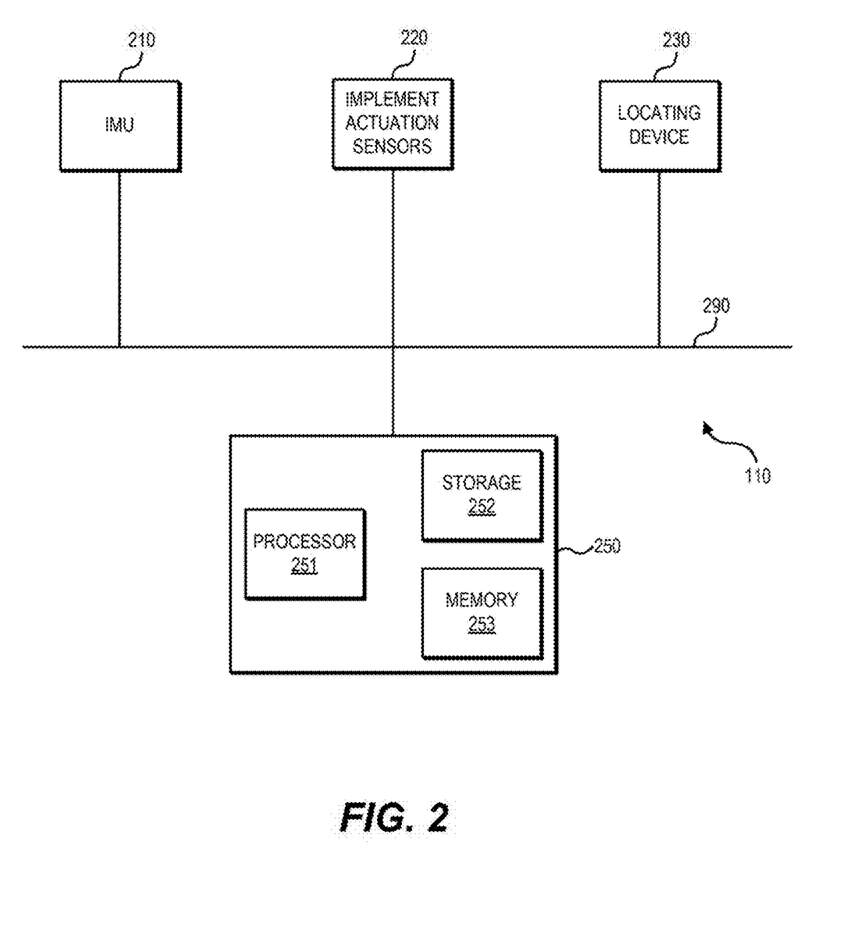
FIG. 2 is a diagrammatic illustration of an exemplary disclosed implement position control system that may be used in conjunction with the machine of FIG. 1.

FIG. 2 illustrates an implement position control system 110 that may be integrated with machine 100. Implement position control system 110 may include an IMU 210, implement actuation sensors 220, a locating device 230, and controller 250. Implement position control system 110 may be adapted to control or direct the movement of implement 102 based on the inputs from the input devices in cab 104, IMU 210, implement actuation sensors 220, a locating device 230, and controller 250. In particular, the above sensors and controller 250 may be connected to each other via a bus 290 and controller 250 may control or direct movement of implement 102 by controlling extension of hydraulic lift actuators 114 and hydraulic tilt actuators 116. While a bus architecture is shown in FIG. 2, any suitable architecture may be used, including any combination of wired and/or wireless networks. Additionally, such networks may be integrated into any local area network, wide area network, and/or the Internet.

IMU 210 may include any device (such as a gyroscope) capable of measuring an angular rate (e.g., a yaw rate, pitch rate, roll rate) of machine 100 and producing a corresponding signal. Exemplarily, IMU 210 may include a 3-axis angular rate gyro that provides signals indicative of the pitch rate, yaw rate, and roll rate of machine 100. IMU 210 may also include one or more accelerometers and/or pendulous-based inclinometers capable of measuring the acceleration of machine 100 along one or more axes. The accelerometers may provide acceleration of machine 100 along a forward axis, and such acceleration values may be utilized to determine a pitch of machine 100. Similarly, the accelerometers may provide acceleration of machine 100 along a side axis and such acceleration values may be utilized to determine a roll of machine 100.

Implement actuation sensors 220 may provide extension values for hydraulic lift actuators 114 and hydraulic tilt actuators 116. Exemplarily, implement actuation sensors 220 may provide an offset of cutting edge 108 from the machine origin. For example, if machine origin is the location of GPS 122, implement actuation sensors 220 may provide a 3-dimensional offset of edge 108 from GPS 122 based on the extensions of hydraulic lift actuators 114 and hydraulic tilt actuators 116.

Locating device 230 may include any device capable of providing a signal that indicates machine 100's location. Exemplarily, locating device 230 may include position determining system 122, which is shown in FIG. 1 as embodying a global satellite system device (e.g., a GPS device). Locating device 230 may be configured to convey a signal indicative of the received or determined positional information to one or more of interface devices for display of machine location. The signal may also be directed to controller 250 for further processing. In the exemplary embodiments discussed herein, locating device 230 provides a GPS signal as the location signal indicative of the location of machine 100. However, it will be understood by one of ordinary skill in the art that the disclosed exemplary embodiments could be modified to utilize other indicators of the location of machine 100, if desired.

Controller 250 may include a processor 251, a storage 252, and a memory 253, assembled together in a single device and/or provided separately. Processor 251 may include one or more known processing devices, such as a microprocessor. Memory 253 may include one or more storage devices configured to store information used by the controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one exemplary embodiment, memory 253 may include one or more implement position control programs or subprograms loaded from storage 252 or elsewhere that, when executed by processor 251, perform various procedures, operations, or processes consistent with disclosed embodiments. For example, memory 253 may include one or more programs that enable controller 250 to, among other things, collect data from the above-mentioned units and process the data according to disclosed embodiments such as those embodiments discussed with regard to FIGS. 3, 4, 5, and 6 and control a position of implement 102 based on the processed data.

To control implement 102, controller 250 (more particularly, processor 251) may calibrate implement actuation sensors 220 by comparing, for example, the elevation of implement 102 with the elevation of tracks 118 at the same location on terrain 120 along machine 100's direction of travel. When implement 102 is loaded and machine 100 is moving forward, the elevation of tracks 118 and implement 102 is expected to be the same at the same terrain 120 location, assuming implement 120 is touching terrain 120. Accordingly, controller 250 may calibrate the implement actuation sensors 220 by comparing the elevation of implement 102 and elevation of a selected point on tracks 118. If the system is out of calibration, a non-zero elevation difference may exist between the elevations of implement 102 and the selected point on tracks 118.

Figure 3:
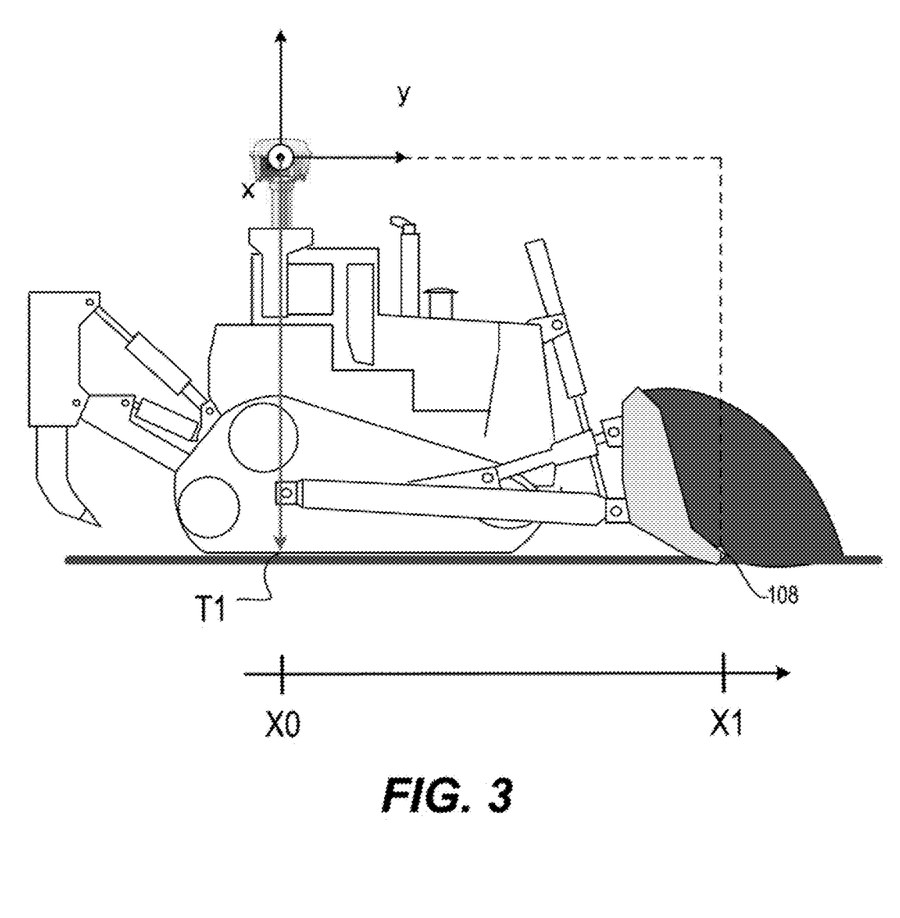
FIG. 3 is a diagrammatic illustration of a scenario in which the disclosed implement position control system may execute.

When machine 100 is spreading, which means that the elevation of implement 102 is higher than the elevation of terrain 120, a modified approach to calibration may become necessary. This is because machine 100 may spread the material (e.g., soil) and tracks 118 may drive over the soil that was spread thereby compacting the soil. As a result, when the selected point on tracks 118 arrives at the location where the implement 102 elevation was taken, the elevation of the selected point may not be the same as the elevation of implement 102 at that location. Therefore, the elevation difference between implement 102 and tracks 118 may not be accurate. FIG. 3, discussed next, illustrates this scenario in detail.

In the scenario of FIG. 3, the selected or predetermined point on tracks 118 is T1, which is at a position X0 on terrain 120. The left or right cutting edge 108 is at position X1 on terrain 120. Assume that controller 250 takes an elevation of cutting edge 108 when it is at position X1 and assume that this elevation is 50 feet. Assume also that the elevation of terrain 120 is 40 feet, which indicates that machine 100 is spreading. Now, to calibrate implement actuation sensors 220, controller 250 may take an elevation of T1 when T1 arrives at position X1. Controller 250 may then take a difference between the elevations of T1 and cutting edge 108 at position X1. In a properly calibrated system, the elevation of T1 at position X1 should also be 50 feet because as discussed earlier, a non-zero elevation difference may exist between tracks 118 and implement 102 in a properly calibrated system. However, if machine 100 is spreading, compaction of the soil that has been spread will occur as a result of tracks 118 driving over the soil. Accordingly, by the time point T1 gets to position X1, the elevation of T1 will likely be less than 50 feet. Therefore, the elevation difference between implement 102 and tracks 118 may not be accurate unless compaction is accounted for. The next few paragraphs describe how controller 250 may take compaction into account when calculating the difference in elevation of implement 102 and a selected point (e.g., T1 here) on tracks 118.

To calculate the elevation difference, controller 250 may use the following exemplary equation:

$$\text{elev\_diff} = \text{blade\_elev} - (((\text{blade\_elev} - \text{terrain\_elev}) * CF) + \text{track\_elev}) \quad (1)$$

In equation (1), elev_diff may refer to the elevation difference between implement 102 and tracks 118, and controller 250 may utilize elev_diff to calibrate the implement actuation sensors 220. Blade_elev may refer to the elevation of cutting edge 108 of implement 102 at point X1 on terrain 120. Terrain_elev may refer to the elevation of point X1. It will be noted that terrain_elev may be known to controller 250 from a previous pass by machine 100 over point X1 or from other sources (e.g., a survey map). Track_elev may refer to the elevation of point T1 on tracks 118 when it arrives at point X1. 'CF' may refer to compaction factor. The compaction factor may exemplarily be a value between 0 and 1 that may be calculated using any suitable technique. For example, compaction factor may be calculated empirically by driving machine 100 over different types of materials (e.g., different types of soils) and over different types of terrains, and determining a required adjustment to the track elevation for a desired result under equation (1). By including a compaction factor and adjusting the track elevation measurement before the elevation difference is taken, controller 250 may provide a more accurate calculation of the elevation difference between the tracks 118 and implement 102.

In executing equation (1) to calculate the elevation difference, controller 250 may take into account various scenarios in which execution of equation (1) may not be suitable. For example, equation (1) may not be suitable (and more specifically, application of the compaction factor may not be suitable) in a scenario in which track_elev is greater than blade_elev. If such measurements are detected by controller 250, it may indicate to controller 250 that there is an error in the system because track_elev being greater than blade_elev constitutes a scenario in which tracks 118 are floating in mid-air, which is physically not possible. In such a scenario, controller 250 may revert to measuring a difference between track_elev and blade_elev instead of using equation (1) above. That is, controller 250 may simply take the difference between track_elev and blade_elev, and utilize this difference to calibrate the implement actuation sensors 220. Further details regarding an exemplary algorithm implemented by controller 250 are discussed in the next section with reference to FIG. 6.

Figure 4:
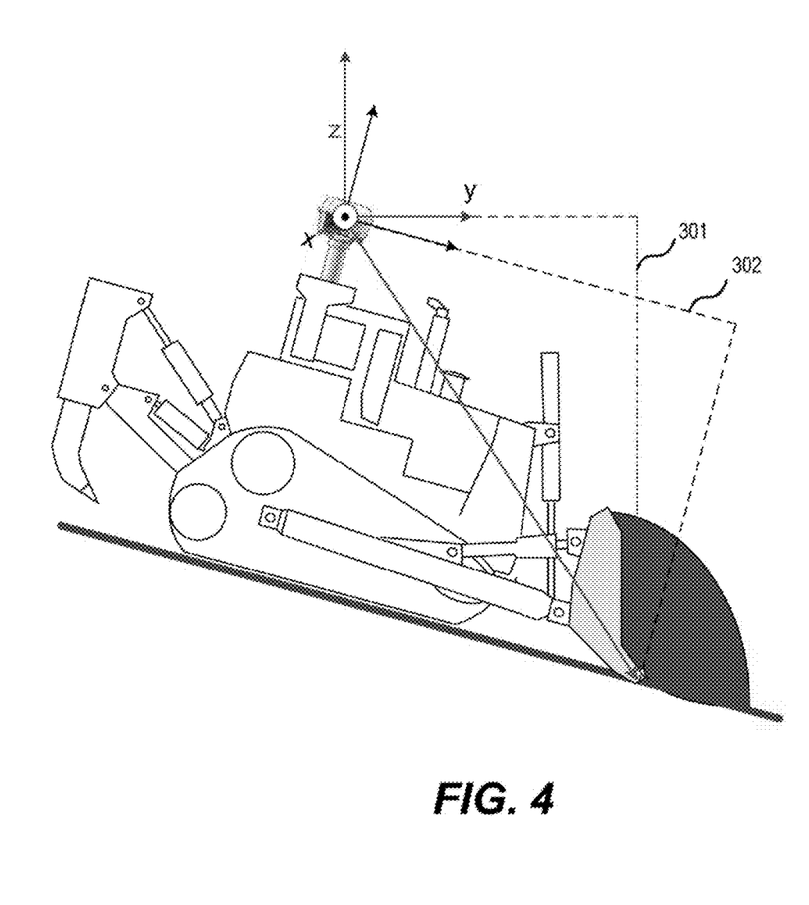
FIG. 4 is a diagrammatic illustration of a translation of an implement position from a local coordinate frame to a gravity coordinate frame.

The above discussion generally focused on the utilization of a compaction factor when calculating the elevation difference. The next few paragraphs discuss exemplary calculations of track_elev and blade_elev. An exemplary calculation of blade_elev is discussed with reference to FIG. 4. In FIG. 4, the reference numerals from FIG. 1 are not repeated but it will be understood that same elements between FIGS.

4 and 1 have same reference numerals. As seen in FIG. 4, machine 100 is traveling downhill. Accordingly, the gravity coordinate frame 301 (also referred to herein as "GPS coordinate frame 301") and the local coordinate frame 302 (also referred to herein as "body coordinate frame 302") are different. Implement actuation sensors 220 may provide to controller 250 an offset of cutting edge 108 from the machine origin (e.g., location of GPS 122) in the longitudinal (y) axis, vertical (z) axis, and horizontal (x) axis of the local coordinate frame 302. For ease of reference, these offsets can be grouped into a 3 by 1 (3×1) vector and referred to as $I_{MACH}$. It may be desirable to compute the elevation of implement 102 (or blade_elev) in the gravity or GPS coordinate frame 301, i.e., calculate the absolute elevation of implement 102. Accordingly, vector $I_{MACH}$ may be translated into the GPS coordinate frame 301 by utilizing the orientation of machine 100 (e.g., the yaw, pitch, and roll of machine 100) and well-known rotation matrices. It will be understood that controller 250 may determine the orientation of machine 100 (e.g., the yaw, pitch, and roll of machine 100) using data received from IMU 210 and locating device 230. For example, controller 250 may utilize a Kalman filter to determine the orientation of machine 100. Further details regarding the orientation calculation are not provided because any well-known technique may be used to calculate the orientation of machine 100. Assuming that pitch is denoted by β, roll is denoted by γ, and yaw is denoted by α, the following exemplary equation may be utilized by controller 250 to translate $I_{MACH}$ from local coordinate frame 302 to GPS coordinate frame 301:

$$I_{GPS} = R_Z(\text{yaw}) * R_Y(\text{roll}) * R_X(\text{pitch}) * I_{MACH} \qquad (2)$$

where $$R_Z(\text{yaw}) = \begin{pmatrix} \cos\alpha & -\sin\alpha & 0 \\ \sin\alpha & \cos\alpha & 0 \\ 0 & 0 & 1 \end{pmatrix} \qquad (3)$$

$$R_Y(\text{roll}) = \begin{pmatrix} 1 & 0 & 0 \\ 0 & \cos\gamma & -\sin\gamma \\ 0 & \sin\gamma & \cos\gamma \end{pmatrix} \qquad (4)$$

$$R_X(\text{pitch}) = \begin{pmatrix} \cos\beta & 0 & \sin\beta \\ 0 & 1 & 0 \\ -\sin\beta & 0 & \cos\beta \end{pmatrix} \qquad (5)$$

Controller 250 may determine blade_elev (which may be the absolute elevation of cutting edge 108) by simply adding the elevation of GPS 122, which is already in the GPS coordinate frame, to the elevation component in $I_{GPS}$ (e.g., z-component in $I_{GPS}$). The elevation of GPS 122 may be readily available based on the data received by GPS 122.

Figure 5:
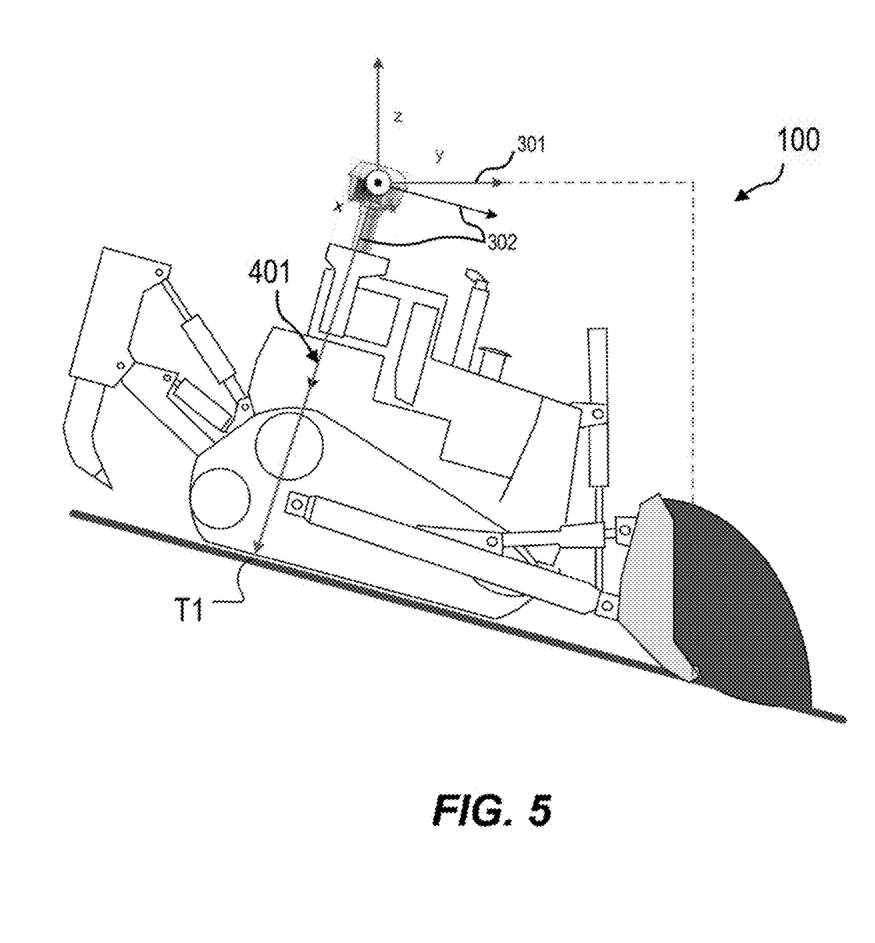
FIG. 5 is a diagrammatic illustration of a translation of a track position from a local coordinate frame to a gravity coordinate frame.

The above calculation may occur based on the left or right cutting edge 108 crossing a given location (e.g., 'X1'). A similar calculation may be carried out by controller 250 for a predetermined point (e.g., 'T1') on tracks 118 when the predetermined point crosses location X1. This calculation is now described with reference to FIG. 5. In FIG. 5, the reference numerals from FIG. 1 are not repeated but it will be understood that same elements between FIGS. 5 and 1 have same reference numerals. To determine elevation of point T1 on tracks 118 when T1 crosses X1, controller 250 may determine a fixed vector 401 between the origin (e.g., GPS 122) of local coordinate frame 302 and point T1. As vector 401 may be fixed, it may be readily obtained by controller 250 from, for example, memory 253. Vector 401 (say $V_{MACH}$) may be translated into GPS coordinate frame 301 using the following equation, which is similar to equation (2):

$$V_{GPS} = R_z(\text{yaw}) * R_y(\text{roll}) * R_x(\text{pitch}) * V_{MACH} \qquad (6)$$

The rotation matrices in equation (6) are the same as those described in equations (3)-(5). Also, for purposes of equation (6), controller 250 may utilize the orientation values at the time of point—T1 crossing X1 or it may utilize the orientation values that were used to calculate $I_{GPS}$ in equation (2). Controller 250 may determine the absolute elevation of point T1 by simply adding the elevation of GPS 122, which is already in the GPS coordinate frame, to the elevation component in $V_{GPS}$ (e.g., z-component in $V_{GPS}$). The elevation of GPS 122 may be readily available based on the data received by GPS 122.

As a recap, to calibrate implement actuation sensors 220, controller 250 may compare the absolute elevation of point T1 (which may suggest the elevation of tracks 118) with the absolute elevation of cutting edge 108 (which can be thought of as indicating the elevation of implement 102). As discussed above, this comparison may be by way of taking an elevation difference as set forth in equation (1). Moreover, the elevation difference (e.g., elev_diff in equation (1)) between the elevation of tracks 118 and implement 102 could be averaged over time, where a running average of zero would indicate acceptable calibration of implement actuation sensors 220. Controller 250 may alert the end user that the system is out of calibration if the difference exceeds a threshold, or it may automatically adjust the implement actuation sensor calibration values in a closed-loop manner to compensate for the elevation difference between the implement 102 and tracks 118.

Figure 6:
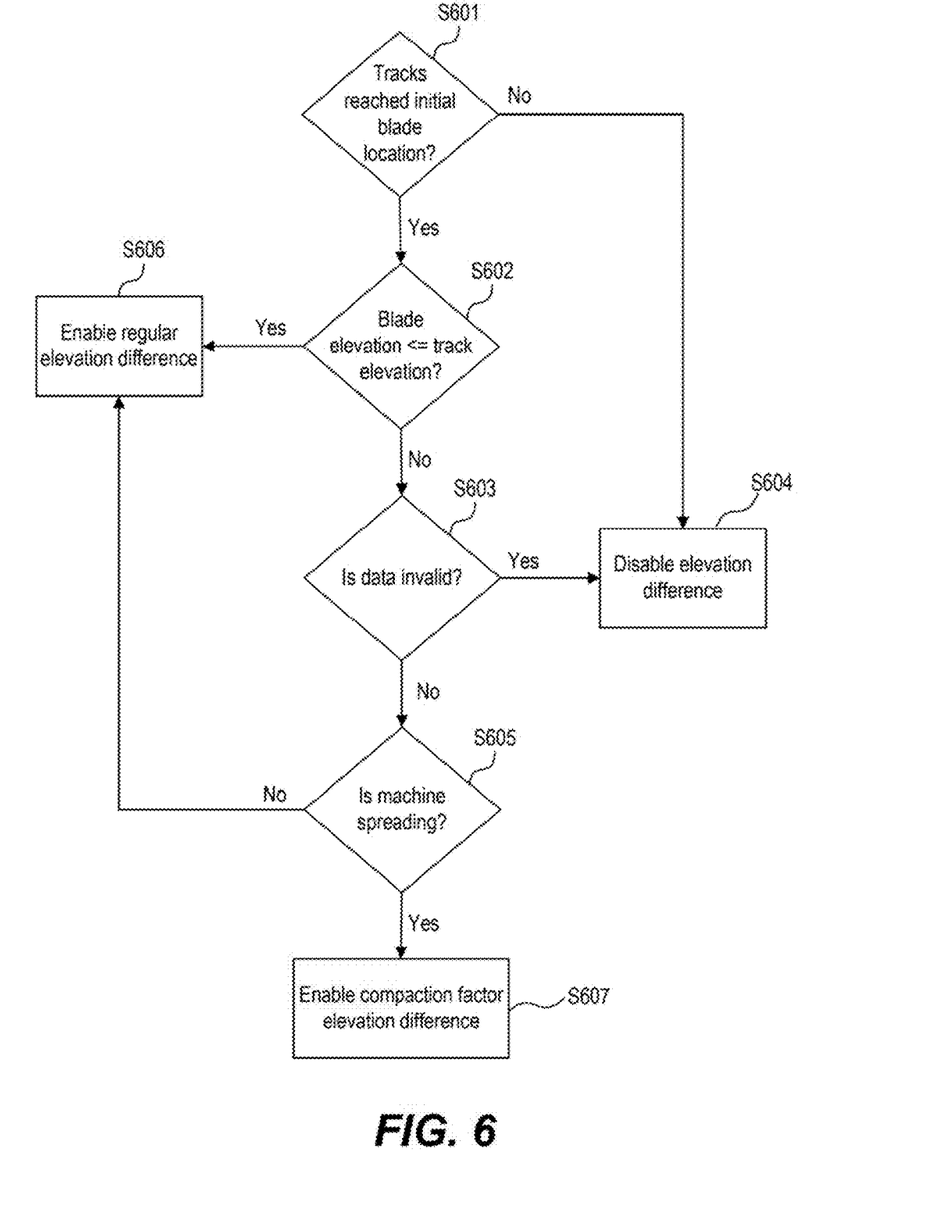
FIG. 6 is a flowchart illustrating an exemplary method performed by the disclosed implement position control system.

FIG. 6 further describes exemplary operations of controller 250 to calibrate implement actuation sensors 220. A detailed description of FIG. 6 is provided in the next section.

INDUSTRIAL APPLICABILITY

The disclosed implement position control system 110 may be applicable to any machine where accurate detection of an implement's elevation is desired. The disclosed implement position control system 110 may provide for improved estimation of implement 102's elevation by comparing the elevation of implement 102 indicated by the implement actuation sensors with the elevation of the tracks measured utilizing the pose-system (e.g., locating device 230 and/or IMU 210). Additionally, the elevation difference computation may take into account a compaction factor, which may allow the track elevation measurement to be adjusted before the elevation difference is taken. The compaction factor may account for a decrease in the detected elevation of elevation a selected point on tracks 118 when machine 100 is spreading and compaction occurs due to tracks 118 driving over the spread material. As a result, controller 250 may provide a more accurate calculation of the elevation difference between the tracks 118 and implement 102. Operation of the implement position control system 110 will now be described in connection with the exemplary flowchart of FIG. 6.

FIG. 6 illustrates an exemplary flowchart to calibrate implement actuation sensors 220 to allow for accurate position control of implement 102. In step 601, controller 250 may determine whether tracks 118 have reached an initial blade location. For example, controller 250 may determine whether point T1 on tracks 118 has reached point X1 on terrain 120 where an elevation was calculated for implement 102.

If controller 250 determines in step 601 that point T1 on tracks 118 has not reached point X1 on terrain 120, the elevation difference calculation may be disabled in step 604. More specifically, elevation difference may be disabled until point T1 arrives at point X1.

If controller 250 determines in step 601 that point T1 on tracks 118 has reached point X1 on terrain 120, controller 250 may proceed to step 602 in which it may determine whether blade elevation is less than or equal to track elevation. For example, in step 602, controller 250 may determine whether the elevation of implement 102 (blade_elev) calculated at point X1 is less than or equal to the elevation of point T1 (track_elev) at point X1. As discussed in the previous section, controller 250 may determine the elevation of implement 102 (e.g., the elevation of cutting edge 108) by adding the elevation of GPS 122, which is already in the GPS coordinate frame, to the elevation component in $I_{GPS}$ (e.g., z-component in $I_{GPS}$) calculated in equation (2) above. To determine the elevation of point T1, controller 250 may determine a fixed vector 401 ('$V_{MACH}$') between the origin (e.g., GPS 122) of local coordinate frame 302 and point T1. Vector 401 ('$V_{MACH}$') may be translated into the GPS coordinate frame 301 using equation (5), which results in vector $V_{GPS}$. Controller 250 may calculate the absolute elevation of point T1 by simply adding the elevation of GPS 122, which is already in the GPS coordinate frame, to the elevation component in $V_{GPS}$ (e.g., z-component in $V_{GPS}$).

If controller 250 determines in step 602 that blade elevation is less than or equal to track elevation, controller 250 may enable regular elevation difference in step 606. Controller 250 may determine that the blade elevation is less than or equal to track elevation if it determines that the elevation of implement 102 at point X1 is less than or equal to the elevation of T1 at point X1. When regular elevation difference is enabled, controller 250 may simply take the difference between track_elev and blade_elev, and utilize this difference to calibrate the implement actuation sensors 220. It will be noted that both track_elev and blade_elev refer to elevations of point T1 and cutting implement 102.

If controller 250 determines in step 602 that blade elevation is not less than or equal to track elevation, controller 250 may determine in step 603 whether the data measured by controller 250 (e.g., track_elev and blade_elev) is invalid. Exemplarily, the measured data may be determined to be invalid if machine 100 is steering or a service break of machine 100 is activated. As will be explained in the following paragraphs, if it is determined that machine 100 is spreading, additional checks may be made to determine if the data is invalid.

If controller 250 determines in step 603 that the data is invalid, it may proceed to step 604 and disable the elevation difference calculation. If, however, controller 250 determines that the data is not invalid in step 603, it may determine in step 605 whether machine 100 is spreading. Steps 601, 602, and 603 may be thought of as a set of conditions to be checked before checking in step 605 whether machine 100 is spreading. Moreover, it will be apparent that the order of steps in the algorithm of FIG. 6 may be varied. For example, step 605 may be executed by controller 250 prior to executing steps 601, 602, and 603.

Controller 250 may determine that machine 100 is spreading if the blade elevation (e.g., blade_elev at point X1) is greater than the terrain elevation at X1 (e.g., terrain_elev at point X1). If controller 250 determines in step 605 that machine 100 is not spreading, regular elevation difference may be enabled in step 606. As discussed earlier, when regular elevation difference is enabled, controller 250 may simply take the difference between track_elev and blade_elev, and utilize this difference to calibrate the implement actuation sensors 220.

If, however, controller 250 determines in step 605 that machine 100 is spreading, controller 250 may enable compaction factor elevation difference. When compaction factor elevation difference is enabled, controller 250 may determine the elevation difference between implement 102 and tracks 118 by taking into account the compaction factor. For example, controller 250 may execute equation (1) above to calculate the elevation difference (elev_diff). Controller 250 may utilize the elevation difference to calibrate the implement actuation sensors 220. It should, however, be noted that equation (1) may not be executed if the measured values are likely to be invalid. For example, if the amount of material carried by implement 102 is lower than a predetermined threshold value, the measured values (track_elev and blade_elev) may be determined as invalid data points. The measured data may also be determined to be invalid if jumps in elevation of terrain 120 (terrain_elev) are greater than some predetermined threshold because this may indicate that the terrain has not been measured properly.

The disclosed exemplary embodiments may allow for an accurate calibration of the implement actuation sensors and hence, allow for a more accurate positioning and control of the implement of machine 100. For example, the disclosed exemplary embodiments may allow for calibration of the implement actuation sensors on the field even when the ground surfaces are uneven. Furthermore, by taking into account the compaction factor, the disclosed embodiments may allow an accurate calibration of the implement actuation sensors even when the machine is spreading.

It will be apparent to those skilled in the art that various modifications and variations can be made to the disclosed embodiments. Other embodiments will be apparent to those skilled in the art from consideration of the specification and practice of the disclosed embodiments. It is intended that the specification and examples be considered as exemplary only, with a true scope being indicated by the following claims.

What is claimed is:

1. A method for calibrating an implement actuation sensor of a machine, comprising:
    receiving, by a controller, a first elevation value of an implement of the machine from the implement actuation sensor;
    receiving, by the controller, a second elevation value of a ground-engaging device of the machine from a pose-system;
    determining, by the controller, whether a first set of conditions is satisfied;
    in response to the first set of conditions being satisfied, determining, by the controller, whether the machine is spreading;
    in response to determining that the machine is spreading, adjusting, by the controller, the second elevation value based on a compaction factor to determine an adjusted second elevation value;
    determining, by the controller, a first elevation difference value based on a difference between the first elevation value and the adjusted second elevation value; and
    calibrating, by the controller, the implement actuation sensor based on the determined difference; and directing, by the controller, movement of the implement based on the calibration.

2. The method of claim 1, wherein calculating the first elevation value includes:
calculating an offset of an implement cutting edge from an origin in a local coordinate frame of the machine, and
translating the offset from the local coordinate frame to a gravity coordinate frame of the machine.

3. The method of claim 1, wherein determining whether the machine is spreading includes:
comparing the first elevation value with a terrain elevation value where the first elevation value and the terrain elevation value correspond to a first terrain location, and
determining that the machine is spreading when the first elevation value is greater than the terrain elevation value.

4. The method of claim 3, wherein the second elevation value of the ground-engaging device is calculated when a predetermined point on the ground-engaging device crosses the first terrain location.

5. The method of claim 4, wherein the first elevation difference value is calculated using the equation:

$$\text{elev\_diff} = \text{blade\_elev} - (((\text{blade\_elev} - \text{terrain\_elev}) * CF) + \text{track\_elev})$$

where elev_diff is the first elevation difference value, blade_elev is the first elevation value, terrain_elev is the terrain elevation value, CF is the compaction factor, and track_elev is the second elevation value.

6. The method of claim 1, further including:
in response to determining that the machine is not spreading, calculating a second elevation difference value based on a difference between the first elevation value and the second elevation value.

7. The method of claim 1, wherein the first set of conditions is not satisfied if the machine is steering or if a service brake is activated.

8. A implement position control system in a machine, comprising:
an implement actuation sensor associated with an implement of the machine; and
a controller in communication with the implement actuation sensor, the controller configured to:
receive a first elevation value of an implement of the machine from the implement actuation sensor;
receive a second elevation value of a ground-engaging device of the machine from a pose-system;
determine whether a first set of conditions is satisfied;
in response to the first set of conditions being satisfied, determine whether the machine is spreading;
in response to determining that the machine is spreading, adjust the second elevation value based on a compaction factor to determine an adjusted second elevation value;
determine a first elevation difference value based on a difference between the first elevation value and the adjusted second elevation value;
calibrate the implement actuation sensor based on the determined difference; and
direct movement of the implement based on the calibration.

9. The system of claim 8, wherein calculating the first elevation value includes:
calculating an offset of an implement cutting edge from an origin in a local coordinate frame of the machine, and
translating the offset from the local coordinate frame to a gravity coordinate frame of the machine.

10. The system of claim 8, wherein determining whether the machine is spreading includes:
comparing the first elevation value with a terrain elevation value where the first elevation value and the terrain elevation value correspond to a first terrain location, and
determining that the machine is spreading when the first elevation value is greater than the terrain elevation value.

11. The system of claim 10, wherein the second elevation value of the ground-engaging device is calculated when a predetermined point on the ground-engaging device crosses the first terrain location.

12. The system of claim 11, wherein the first elevation difference value is calculated using the equation:

$$\text{elev\_diff} = \text{blade\_elev} - (((\text{blade\_elev} - \text{terrain\_elev}) * CF) + \text{track\_elev})$$

where elev_diff is the first elevation difference value, blade_elev is the first elevation value, terrain_elev is the terrain elevation value, CF is the compaction factor, and track_elev is the second elevation value.

13. The system of claim 8, wherein the controller is further configured to calculate a second elevation difference value based on a difference between the first elevation value and the second elevation value in response to determining that the machine is not spreading.

14. The system of claim 8, wherein the first set of conditions is not satisfied if the machine is steering or if a service brake is activated.

15. A non-transitory computer-readable storage medium storing instructions that enable a computer to execute a method for calibrating an implement actuation sensor of a machine, the method comprising:
receiving, by a controller, a first elevation value of an implement of the machine;
receiving, by the controller, a second elevation value of a ground-engaging device of the machine;
determining, by the controller, whether a first set of conditions is satisfied;
in response to the first set of conditions being satisfied, determining, by the controller, whether the machine is spreading;
in response to determining that the machine is spreading, adjusting, by the controller, the second elevation value based on a compaction factor to determine an adjusted second elevation value;
determining, by the controller, a first elevation difference value based on a difference between the first elevation value and the adjusted second elevation value; and
calibrating, by the controller, the implement actuation sensor based on the determined difference; and
directing, by the controller, movement of the implement based on the calibration.

16. The non-transitory computer-readable storage medium of claim 15, wherein calculating the first elevation value includes:
calculating an offset of an implement cutting edge from an origin in a local coordinate frame of the machine, and
translating the offset from the local coordinate frame to a gravity coordinate frame of the machine.

17. The non-transitory computer-readable storage medium of claim 15, wherein determining whether the machine is spreading includes:

comparing the first elevation value with a terrain elevation value where the first elevation value and the terrain elevation value correspond to a first terrain location, and determining that the machine is spreading when the first elevation value is greater than the terrain elevation value.

18. The non-transitory computer-readable storage medium of claim 17, wherein the second elevation value of the ground-engaging device is calculated when a predetermined point on the ground-engaging device crosses the first terrain location.

19. The non-transitory computer-readable storage medium of claim 18, wherein the first elevation difference value is calculated using the equation:

$$elev\_diff = blade\_elev - (((blade\_elev - terrain\_elev) * CF) + track\_elev)$$

where elev_diff is the first elevation difference value, blade_elev is the first elevation value, terrain_elev is the terrain elevation value, CF is the compaction factor, and track_elev is the second elevation value.

20. The non-transitory computer-readable storage medium of claim 15, further including:

in response to determining that the machine is not spreading, calculating a second elevation difference value based on a difference between the first elevation value and the second elevation value.

* * * * *